United States Patent [19]

Kimura et al.

[11] 4,392,971

[45] Jul. 12, 1983

[54] HEAT STORAGE MATERIAL

[75] Inventors: Hiroshi Kimura; Junjiro Kai, both of Amagasaki, Japan

[73] Assignee: Mitsubishi Denki Kabushiki Kaisha, Tokyo, Japan

[21] Appl. No.: 332,172

[22] Filed: Dec. 18, 1981

[30] Foreign Application Priority Data

May 8, 1981 [JP] Japan ................................. 56-69619

[51] Int. Cl.$^3$ .......................... C09K 5/06; F24H 7/00; F24J 3/02
[52] U.S. Cl. ........................................ 252/70; 165/10
[58] Field of Search .............. 252/70; 165/10; 23/300, 23/301

[56] References Cited

U.S. PATENT DOCUMENTS

| | | | |
|---|---|---|---|
| 1,951,886 | 3/1934 | Sundstrom | 23/300 |
| 3,906,140 | 9/1975 | Capes | 428/403 |
| 4,119,556 | 10/1978 | Chubb | 126/400 |
| 4,175,613 | 11/1979 | Chubb | 126/400 |
| 4,234,782 | 11/1980 | Barabas et al. | 126/400 |
| 4,338,208 | 7/1982 | Lane et al. | 252/70 |

FOREIGN PATENT DOCUMENTS

| | | | |
|---|---|---|---|
| 51-144774 | 6/1976 | Japan | 252/70 |
| 51-2621 | 7/1976 | Japan | 252/70 |

OTHER PUBLICATIONS

Chemical Abstracts, vol. 84, No. 177, (1976), Ref. 1 08 450 v.
Solar Energy, vol. 23, pp. 343-350 (1979); B. Carlsson, H. Stymne and G. Wettermark.
Solar Energy Storage; Dr. Maria Telkes, Ashrae Journal Sep. 1974; pp. 38-44.
"Macro Encapsulation of Heat Storage Phase-Change Materials"; George A. Lane, Proceedings of Second Annual Thermal Energy Storage Contractors' Information Exchange Meeting, Sep. 1977, pp. 43-67.

Primary Examiner—Dennis L. Albrecht
Attorney, Agent, or Firm—Oblon, Fisher, Spivak, McClelland & Maier

[57] ABSTRACT

A heat storage material comprises a composition of $CaCl_2.6H_2O$ for preventing a crystallization of $CaCl_2.4H_2O$ and 0.01 wt. % or more of at least one compound selected from the group consisting of KCl, RbCl, NaCl, NaF, $Na_3AlF_6$ and other double salts of NaF.

3 Claims, No Drawings

HEAT STORAGE MATERIAL

BACKGROUND OF THE INVENTION

1. Field of the Invention

The present invention relates to a heat storage material comprising $CaCl_2$ hydrate for heat storage and radiation with a latent heat in a phase change of fusion and solidification. The heat storage material is used for an air-conditioning, a waste heat recovery or a solar heat storage.

2. Description of the Prior Art

It is most important for the latent heat storage material to be always stable in the repeating heat storage and radiation.

$CaCl_2.6H_2O$ has been considered to be one of promising heat storage materials, since it has phase change temperature of 29° C. and has a latent heat of 41 cal/g. and is economical. However, when $CaCl_2.6H_2O$ is repeatedly phase-changed, a crystallization of $CaCl_2.4H_2O$ ($\alpha$-phase: melting point of 45° C.; $\gamma$-phase: melting point of 38° C.) is easily caused. When such crystallization is caused, the crystal precipitates at the bottom of the fused liquid. The crystals of $CaCl_2.4H_2O$ are grown in the repeated phase changes to decrease $CaCl_2.6H_2O$ as the main component of the heat storage material. Thus, the heat storage capacity of the material is diminished gradually. Such disadvantages can be overcome by the prior invention disclosed in Japanese patent application No. 115450/1980. That is, the crystallization of $CaCl_2.4H_2O$ is not observed in a heat cycle test (at 35° to 18° C.) for 1,000 cycles when the water content of the heat storage material is controlled in a range of 6.0 to 6.14 moles per mole of $CaCl_2$.

The crystallization of $CaCl_2.4H_2O$ can be also prevented by adding a suitable amount of $MgCl_2.6H_2O$, $MgBr_2.6H_2O$ or $CaBr_2.6H_2O$ according to the other prior inventions disclosed in Japanese Unexamined Patent Publication Nos. 43387/1976, 76183/1976 and 128052/1976. However, it is necessary to use a nucleating agent in the compositions in order to prevent the supercooling. That is, the phase change stability of the heat storage material is depending upon the effect of the nucleating agent. There are various remaining problems such as the kinds of the nucleating agent and the incorporation thereof.

SUMMARY OF THE INVENTION

It is an object of the present invention to overcome said disadvantages and to provide a heat storage material which has excellent phase change stability and whose supercoolings can be repeatedly broken at 26° C. or higher.

The foregoing and other objects of the present invention have been attained by providing a heat storage material which comprises a composition of $CaCl_2.6H_2O$ modified for preventing a crystallization of $CaCl_2.4H_2O$ and 0.01 wt.% or more of at least one compound selected from the group consisting of KCl, RbCl, NaCl, NaF, $Na_3AlF_6$ and other double salts of NaF.

DETAILED DESCRIPTION OF THE PREFERRED EMBODIMENTS

In order to show difference of the antisupercooling effects of NaCl as a "nucleation promoting agent" (as the function of KCl, RbCl, NaCl, NaF, $Na_3AlF_6$ and other double salts of NaF in nucleation of $CaCl_2.6H_2O$ is different from ordinary nucleating agent, the name "nucleation promoting agent" is used for them hereafter) in the present invention and $Ba(OH)_2.8H_2O$ or $BaF_2$ as a conventional nucleating agent, heat cycle tests in the incorporation of each of the three compounds into the heat storage material are carried out. The results are shown in Table 1.

In the heat cycle tests, each sample is charged into a glass tube having an inner diameter of 20 mm and a length of 1,000 mm and the glass tube is closed and treated by heat changes in a range of 35° C.–18° C. in 8 cycles per day.

TABLE 1

| | Result of heat cycle test | | |
|---|---|---|---|
| No. | Sample | Additive | Temperature for breaking super-cooling state (°C.) |
| 1 | $CaCl_2.6.11H_2O$ | $Ba(OH)_2.8H_2O$ | 21.8 ± 1.1 |
| 2 | $CaCl_2.6.11H_2O$ | $BaF_2$ | 22.0 ± 1.7 |
| 3 | $CaCl_2.6.11H_2O$ | NaCl(1 wt. %) | 25.7 ± 0.2 |

The temperature for breaking the supercooling state is measured by six thermocouples put in a thin glass tube fixed at the central part of the glass pipe. The figures shown after ± mean standard deviations ($\sigma$). In Table 1, it is found that the supercooling of the sample No. 3 of the present invention is broken at a temperature higher than those of the samples No. 1 and No. 2 using the conventional nucleating agent by about 4° C. and the variance of the temperature of the sample No. 3 is quite smaller than those of the samples No. 1 and No. 2. The test result of a sample prepared by incorporating 0.5 wt.% of NaF instead of NaCl of the sample No. 3 is substantially the same as that of the sample No. 3.

It is not clear what kind of reaction results by the incorporation of the nucleation promoting agent such as NaCl. According to the chemical analysis, a concentration of NaCl dissolved in the liquid is only about 0.1 wt.%. A special reaction is not found. On the other hand, the solid NaCl precipitated at the bottom of the liquid without the dissolution is in a form of face-centered cubic crystals whereas $CaCl_2.6H_2O$ is in a form of hexagonal crystals. Therefore, nucleation of $CaCl_2.6H_2O$ through epitaxial growth phenomenon resulted by coincidence of crystalline systems and lattice constants can not be considered. Moreover, when the nucleation promoting agent such as NaCl and NaF is added to supercooled molten $CaCl_2.6H_2O$ it does not function to break the supercooled state of $CaCl_2.6H_2O$. Nevertheless, when the "nucleation promoter" is incorporated, if the supercooling state is broken once, the solidification is smoothly repeated in each time as if a memory for solidification is given.

The sample incorporating 0.5 wt.% of NaCl does not form $CaCl_2.4H_2O$ in the heat cycle tests for 1,000 cycles or more. This fact is inconsistent with the report by B. Carlsson and co-workers in Sweden (Solar Energy, 23,343 (1979) which states that the addition of NaCl causes easy formation of $CaCl_2.4H_2O$. The water content of the composition of the present invention is quite different from that of their samples.

The nucleation promoting agent of NaCl or NaF is in a form of face-centered cubic crystals as NaCl form. KCl, RbCl, LiF, KF, RbF, CsF, LiCl, CsCl, LiBr, NaBr, KBr, RbBr, LiI, NaI and RbI have the same crystalline form. KCl and RbCl among them also have excellent antisupercooling effect. Among them, KF and NaBr result in the memory effect when the compositions are used in a special temperature range, however, the memory effect for solidification is lost when they are kept at 35° C. for 70 hours. Therefore, they are not suitable in the practical use. The other compounds do not result in the memory effect.

$Na_3AlF_6$ as a double salt of NaF is in a form of monoclinic crystals and results in the memory effect as NaF does. The following double salts of NaF such as $NaMgF_3$, $NaYF_4$, $NaY_3F_{10}$ and $NaThF_6$ result in also the memory effect.

The content of the nucleation promoting agent such as NaCl is more than the solubility of the compound and is usually in a range of 0.01 to 3 wt.%. If the content is too much, the heat of fusion of the heat storage material is apparently reduced depending upon the weight and volume of the nucleation promoting agent.

The memory effect for solidification is not lost even though the sample is kept at 40° C. for 10 days or longer. When it is cooled, the solidification is immediately performed. Therefore, it is unnecessary to use the conventional nucleating agent. It is enough to give a memory effect for solidification by solidifying the material only once before or after the sealing of the container. However, when the composition is heated to 50° C. or higher, the memory effect for solidification is lost. In order to prevent such trouble, it is preferable to add the conventional nucleating agent, whereby the conventional nucleating agent gives the additional effect to recover the memory effect for solidification even though the memory effect for solidification is lost by the rising of the temperature over 50° C. The normal solidification is performed by the memory effect given by the nucleation promoting agent.

It is possible to incorporate both the nucleation promoting agent which is easily dissolved such as NaCl, KCl and RbCl and the nucleation promoting agent which is not easily dissolved such as NaF and $Na_3AlF_6$ whereby the memory effect for solidification is improved.

The present invention can be also applied for the heat storage materials in the prior inventions such as $CaCl_2.6H_2O$-$MgCl_2.6H_2O$ type heat storage material (Japanese Unexamined Patent Publication No. 43387/1976), $CaCl_2.6H_2O$-$MgBr_2.6H_2O$ type heat storage material (Japanese Unexamined Patent Publication No. 76183/1976) and $CaCl_2.6H_2O$-$CaBr_2.6H_2O$ type heat storage material (Japanese Unexamined Patent Publication No. 128052/1976) and is not limited to the single $CaCl_2.6H_2O$ type heat storage material. In these mixed type heat storage materials, $CaCl_2.4H_2O$ is crystallized by repeating the heat-cycle test and the stable phase change is prevented. It is quite important to prevent the crystallization of $CaCl_2.4H_2O$ in the mixed type heat storage material as well as the single type heat storage material. The prevention of the crystallization of $CaCl_4.4H_2O$ in the mixed type heat storage material is attained in high reliability by using a composition of $CaCl_2$ hydrate having water content at a molar ratio of more than 6.0 and less than 6.14 based on $CaCl_2$. When the nucleation promoting agent such as NaCl is incorporated, copious nucleation is occured and the phase change stability is remarkably improved.

The present invention will be further illustrated by certain examples.

EXAMPLE 1

A composition of $CaCl_2.6.11H_2O$ with 1 wt.% of NaCl was sealed in a black high density polyethylene tube having an inner diameter of 50 mm and a length of 1000 mm. Crystalline fragment of $CaCl_2.6H_2O$ was added as seeds for crystallization before the sealing and was solidified by cooling at 25° C. or lower. The supercooled state of the product was broken at higher than 25° C. and the smooth phase change of solidification-fusion was repeated for 1,000 times or more while remaining stable.

EXAMPLE 2

In accordance with the process of Example 1, a composition of $CaCl_2.6.08H_2O$ with 0.1 wt.% of NaF powder was sealed in the tube. The supercooled state of the product was repeatedly broken at higher than 25° C. and the smooth phase change was repeated for 1,000 times or more while remaining stable.

EXAMPLE 3

In accordance with the process of Example 1, a composition of $CaCl_2.6.11H_2O$ with 0.5 wt.% of KCl and 0.05 wt.% of $Na_3AlF_6$ was sealed in the tube. The supercooling state of the product was repeatedly broken at higher than 24° C. and the smooth phase change was repeated for 1,000 times or more while remaining stable.

EXAMPLE 4

In accordance with the process of Example 1 except using RbCl instead of NaCl, a product was prepared and tested. The phase change stability of the product was substantially the same as that of Example 1.

EXAMPLE 5

In accordance with the process of Example 2 except further incorporating 0.1 wt.% of BaO as a nucleating agent, a product was prepared and tested. The characteristic was similar to that of Example 2.

EXAMPLE 6

In accordance with the process of Example 3 except using $NaMgF_3$ instead of $Na_3AlF_6$, a product was prepared and tested. The smooth phase change as that of Example 3 was repeated for 1,000 times or more while remaining stable.

EXAMPLE 7

In accordance with the process of Example 1, a composition of $CaCl_2.6.13H_2O$ containing 20 mole % of $CaBr_2.6H_2O$ with 1 wt.% of NaCl was sealed in the tube. The supercooling state of the product was repeatedly broken at higher than 18° C. and the smooth phase change was repeated for 500 times or more while remaining stable.

EXAMPLE 8

In accordance with the process of Example 1, a composition of $CaCl_3.6.11H_2O$ containing 15 mole % of $MgBr_2.6H_2O$ with 0.5 wt.% of NaCl and 0.1 wt.% of NaF was sealed in the tube. The supercooling state of the product was repeatedly broken at higher than 17° C. and the smooth phase change was repeated for 200 times or more while remaining stable.

EXAMPLE 9

In accordance with the process of Example 1, a composition of $CaCl_2.6.11H_2O$ containing 20 mole % of $CaBr_2.6H_2O$ with 0.5 wt.% of NaCl was sealed in the tube. The supercooling state of the product was repeatedly broken at higher than 18° C. and the smooth phase change was repeated for 500 times or more while remaining stable.

In accordance with the present invention, the following effects are attained by incorporating a small amount of an nucleation promoting agent such as 1 wt.% of NaCl into the latent heat storage material comprising $CaCl_2.6H_2O$ as a main component and modified for preventing a crystallization of $CaCl_2.4H_2O$.

(1) It is economical as a composition which imparts repeated phase change stability.
(2) A quality control is easy because the sensitive additive is only the nucleation promoting agent such as NaCl.
(3) A heat storage material having high reliability is obtained.
(4) It is unnecessary to consider an arrangement of an antisupercooling material, whereby construction of heat storage device is made simple.
(5) It is unnecessary to use a noxious nucleating agent.

We claim:

1. A heat storage material which comprises a composition of $CaCl_2.6H_2O$ modified for preventing a crystallization of $CaCl_2.4H_2O$ and 0.01 to 3 wt.% of at least one compound selected from the group consisting of KCl, RbCl, NaCl, NaF, $NaMgF_3$, $NaYF_4$, $NaY_3F_{10}$ and $NaThF_6$.

2. The heat storage material according to claim 1 wherein said composition modified for preventing a crystallization of $CaCl_2.4H_2O$ comprises $CaCl_2$ hydrate having water content at a molar ratio of more than 6.0 and less than 6.14 based on $CaCl_2$.

3. The heat storage material according to claim 1 or 2 wherein said composition modified for preventing a crystallization of $CaCl_2.4H_2O$ further comprises at least one component selected from the group consisting of $CaBr_2.6H_2O$ and $MgBr_2.6H_2O$.

* * * * *

Notice of Adverse Decision in Interference

In Interference No. 101,305, involving Patent No. 4,392,971, H. Kimura and J. Kai, HEAT STORAGE MATERIAL, final judgment adverse to the patentees was rendered Aug. 20, 1985, as to claims 1 and 2.
[*Official Gazette November 26, 1985.*]